(12) United States Patent
Khanzode

(10) Patent No.: US 10,430,454 B2
(45) Date of Patent: Oct. 1, 2019

(54) SYSTEMS AND METHODS FOR CULLING SEARCH RESULTS IN ELECTRONIC DISCOVERY

(71) Applicant: Veritas Technologies LLC, Santa Clara, CA (US)

(72) Inventor: Sandeep Khanzode, Mumbai (IN)

(73) Assignee: Veritas Technologies LLC, Santa Clara, CA (US)

( * ) Notice: Subject to any disclaimer, the term of this patent is extended or adjusted under 35 U.S.C. 154(b) by 425 days.

(21) Appl. No.: 14/613,395

(22) Filed: Feb. 4, 2015

(65) Prior Publication Data

US 2016/0179954 A1 Jun. 23, 2016

(30) Foreign Application Priority Data

Dec. 23, 2014 (IN) .............................. 3877/DEL/2014

(51) Int. Cl.
*G06F 16/48* (2019.01)
(52) U.S. Cl.
CPC .................................. *G06F 16/48* (2019.01)
(58) Field of Classification Search
CPC ......... G06F 17/30038; G06F 17/30864; G06F 17/30598; G06F 17/30321; G06F 17/30106; G06F 17/3053
USPC ........................................................ 707/723
See application file for complete search history.

(56) References Cited

U.S. PATENT DOCUMENTS

| | | | |
|---|---|---|---|
| 6,347,313 B1 | 2/2002 | Ma | |
| 6,513,027 B1 | 1/2003 | Powers et al. | |
| 7,743,051 B1* | 6/2010 | Kashyap | ........... G06F 17/30545 707/713 |
| 2010/0162135 A1* | 6/2010 | Wanas | ................... G06Q 10/10 715/753 |
| 2011/0093471 A1* | 4/2011 | Brockway | ......... G06F 17/30616 707/747 |
| 2012/0215796 A1 | 8/2012 | Zhang et al. | |

(Continued)

OTHER PUBLICATIONS

Sandeep Khanzode; Systems and Methods for Expanding Relevant Search Results in Electronic Discovery; U.S. Appl. No. 14/613,393; filed Feb. 4, 2015.

(Continued)

*Primary Examiner* — Pierre M Vital
*Assistant Examiner* — Alicia M Antoine
(74) *Attorney, Agent, or Firm* — FisherBroyles, LLP

(57) ABSTRACT

The disclosed computer-implemented method for culling search results in electronic discovery may include (1) identifying a data source that is subject to electronic discovery in connection with a lawsuit, (2) mining metadata of a plurality of files within the data source to generate metadata derivatives that describe non-content-based attributes of the files, (3) creating an index that groups the files into a plurality of categories representative of the metadata derivatives, (4) receiving, from a user involved in the electronic discovery, user input that specifies a subset of the categories within the index and a keyword, (5) searching the subset of categories within the index for a subset of the files whose contents include the keyword, and (6) providing, to the user, a result of the search that identifies the subset of files whose contents include the keyword. Various other methods, systems, and computer-readable media are also disclosed.

20 Claims, 8 Drawing Sheets

(56) References Cited

U.S. PATENT DOCUMENTS

| | | | |
|---|---|---|---|
| 2013/0282710 A1* | 10/2013 | Raghavan | G06F 17/30554 707/728 |
| 2014/0164314 A1* | 6/2014 | Ahuja | G06F 17/30713 707/600 |
| 2015/0074007 A1* | 3/2015 | Gabriel | G06F 17/30011 705/311 |
| 2015/0112995 A1* | 4/2015 | Elyada | H04W 4/21 707/738 |
| 2015/0215192 A1* | 7/2015 | Shuster | G06F 17/30867 707/711 |
| 2017/0011480 A1* | 1/2017 | Morimoto | G06Q 10/107 |
| 2017/0011481 A1* | 1/2017 | Morimoto | G06Q 30/0185 |
| 2017/0032039 A1* | 2/2017 | Stevenson | G06F 17/30864 |
| 2017/0364535 A9* | 12/2017 | Lavine | G06F 17/30554 |

OTHER PUBLICATIONS

"Predictive Coding Defensibility and the Transparent Predictive Coding Workflow", https://www4.symantec.com/mktginfo/whitepaper/Clearwell/21282415-1_GA_WP_Transparent-Predictive-Coding_0913.pdf, as accessed Nov. 24, 2014, White Paper, Symantec Corporation, (2013).

"Cosine similarity", http://en.wikipedia.org/wiki/Cosine_similarity, as accessed Nov. 24, 2014, Wikipedia, (Jan. 7, 2008).

Bang, Krutika P., et al., "Knowledge Discovery on Web Blog Mining", https://www.academia.edu/5742583/Knowledge_Discovery_On_Web_Blog_Mining_, as accessed Nov. 24, 2014, International Journal of Engineering Sciences & Research Technology, (Feb. 2013), pp. 191-194.

\* cited by examiner

SYSTEMS AND METHODS FOR CULLING SEARCH RESULTS IN ELECTRONIC DISCOVERY

BACKGROUND

In preparation for trial, parties to a lawsuit may request certain electronic files and/or documents from one another by way of electronic discovery (sometimes referred to as "e-discovery"). Unfortunately, the parties may need to search through cumbersome amounts of data to identify the files and/or documents that are sufficiently relevant and/or important to the lawsuit. The files and/or documents resulting from the search may serve as evidence during the trial.

Many conventional electronic discovery tools rely extensively on keyword searches to identify relevant files and/or documents. Given the amount of data being searched, the results of such keyword searches may be vast and unwieldy. For example, the results of a keyword search may include several files and/or documents whose contents include the keyword(s) but are nevertheless irrelevant and/or unimportant to the lawsuit. The instant disclosure, therefore, identifies a need for improved systems and methods for culling search results in electronic discovery.

SUMMARY

As will be described in greater detail below, the instant disclosure describes various systems and methods for culling search results in electronic discovery. In one example, a computer-implemented method for culling search results in electronic discovery may include (1) identifying at least one data source that is subject to electronic discovery in connection with a lawsuit, (2) mining metadata of multiple files within the data source to generate metadata derivatives that describe non-content-based attributes of the files, (3) creating an index that groups the files into multiple categories representative of the metadata derivatives, (4) receiving, from a user involved in the electronic discovery, user input that specifies a subset of the categories within the index and a keyword, (5) searching the subset of categories within the index for a subset of the files whose contents include the keyword, and then (6) providing, to the user involved in the electronic discovery, a result of the search that identifies the subset of files whose contents include the keyword.

In one example, the method may also include performing the search for the subset of files whose contents include the keyword on only the subset of categories within the index due at least in part to the subset of categories being specified by the user input. In this example, the method may further include providing a result of the search that identifies all files within the data source whose contents include the keyword and that have been grouped into at least one of the subset of categories.

In another example, the method may also include searching all of the files within the data source for the subset of the files whose contents include the keyword. In this example, the method may further include providing a result of the search that identifies only files within the subset of files that have been grouped into at least one of the subset of categories specified by the user input. Additionally or alternatively, the method may include providing a result of the search that identifies all files within the data source whose contents include the keyword and then differentiating the files within the data source whose contents include the keyword and that have been grouped into at least one of the subset of categories from one or more other files within the data source whose contents include the keyword and that have not been grouped into any of the subset of categories.

In one example, the method may also include determining that the user has initiated a search of the data source in connection with the lawsuit. In this example, the method may further include presenting, in response to determining that the user has initiated the search, the categories to the user via a user interface. Additionally or alternatively, the method may include receiving, upon presenting the categories to the user, the user input that specifies the subset of categories via the user interface.

In one example, the method may also include identifying primary metadata that represents information about the files in a first context. In this example, the method may further include deriving, from the primary metadata about the files, metadata derivatives that represent the information about the files in a second context that differs from the first context. For example, at least a portion of the primary metadata may include names of all users who contributed to creating the contents of the files. In this example, the method may include deriving the metadata derivatives by calculating a number of users who contributed to creating the content of the files based at least in part on the names of the users who contributed to creating the content of the files. Additionally or alternatively, at least a portion of the metadata derivatives may include the number of users who contributed to creating the contents of the files.

As another example, at least a portion of the primary metadata may include an amount of content in a file created by a certain user. In this example, the method may include deriving the metadata derivatives by calculating a participation score of the certain user with respect to the file based at least in part on the amount of content created by the certain user and/or whether the certain user accessed the file by writing to the file or merely reading the file. In this example, at least a portion of the metadata derivatives may include the participation score of the certain user with respect to the file. As yet another example, the files may include multiple web pages and at least a portion of the primary metadata may include a number of comments posted to the web pages. In this example, the method may include deriving the metadata derivatives by calculating popularity scores for the web pages based at least in part on the number of comments posted to the web pages. In this example, at least a portion of the metadata derivatives may include the popularity scores.

In one example, the method may also include receiving user input that specifies two or more of the categories within the index. In this example, the method may further include identifying a weight that has been assigned to each category within the two or more categories. Additionally or alternatively, the method may include assigning a weighted score for each file within the subset of files by aggregating, for each file within the subset of files, the weights of each category into which the file has been grouped and then ordering the subset of files such that files with a higher score are placed above files with a lower score in a list.

In one example, the data source may include a first data source and a second data source. In this example, the method may also include determining that a file within a first data source is related to a file within a second data source. Additionally or alternatively, the method may include generating, based at least in part on metadata of the file within the first data source, a metadata derivative of the file within the second data source.

Examples of metadata derivatives include, without limitation, a number of messages included in a file, a number of authors who contributed content to a file, a number of images and/or videos included in a file, a ratio of a number of messages in the file to total size of a file, a location of a file and/or an author of a file, an author of a file who most recently and/or most frequently updated the file, an author of a file who initiated a digital conversation included in the file, a status of an author of a file, variations of one or more of the same, combinations of one or more of the same, or any other suitable metadata derivatives. Examples of the files include, without limitation, a document, a digital conversation, an email, a profile, a web content, an image, an audio file, variations of one or more of the same, combinations of one or more of the same, or any other suitable files.

As another example, a system for implementing the above-described method may include (1) an identification module, stored in memory, that identifies at least one data source that is subject to electronic discovery in connection with a lawsuit, (2) a mining module, stored in memory, that mines metadata of multiple files within the data source to generate metadata derivatives that describe non-content-based attributes of the files, (3) a creation module, stored in memory, that creates an index that groups the files into multiple categories representative of the metadata derivatives, (4) a receiving module, stored in memory, that receives, from a user involved in the electronic discovery, user input that specifies a subset of the categories within the index and a keyword, (5) a searching module, stored in memory, that searches the subset of categories within the index for a subset of the files whose contents include the keyword, (6) a providing module, stored in memory, that provides, to the user involved in the electronic discovery, a result of the search that identifies the subset of files whose contents include the keyword, and (7) at least one physical processor configured to execute the identification module, the mining module, the creation module, the receiving module, the searching module, and the providing module.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) identify at least one data source that is subject to electronic discovery in connection with a lawsuit, (2) mine metadata of multiple files within the data source to generate metadata derivatives that describe non-content-based attributes of the files, (3) create an index that groups the files into multiple categories representative of the metadata derivatives, (4) receive, from a user involved in the electronic discovery, user input that specifies a subset of the categories within the index and a keyword, (5) search the subset of categories within the index for a subset of the files whose contents include the keyword, and then (6) provide, to the user involved in the electronic discovery, a result of the search that identifies the subset of files whose contents include the keyword.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
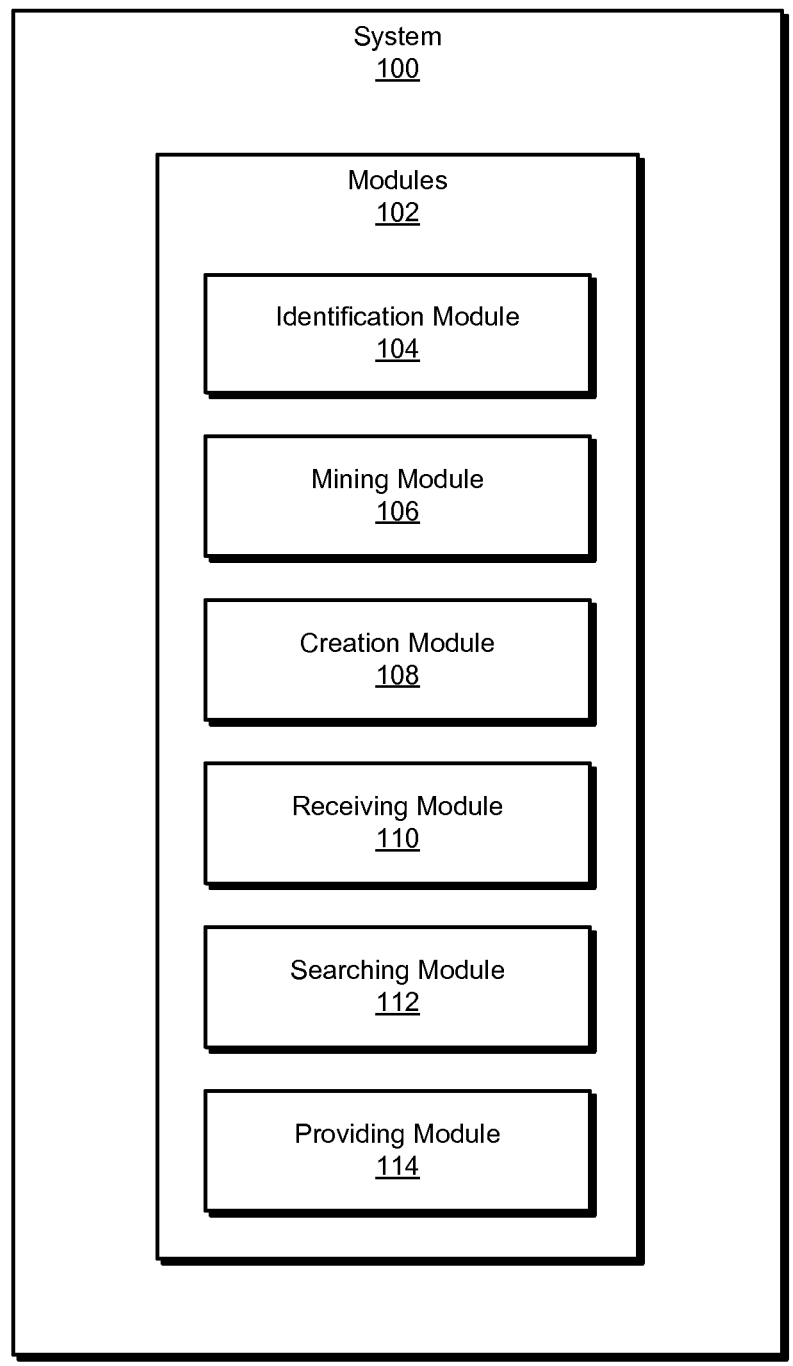
FIG. 1 is a block diagram of an exemplary system for culling search results in electronic discovery.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for culling search results in electronic discovery. The phrase "culling search results," as used herein, generally refers to any type of process and/or procedure that involves narrowing the results of a search based on one or more criteria and/or search parameters.

As will be explained in greater detail below, by analyzing the metadata of files subject to electronic discovery in connection with a lawsuit, the various systems and methods described herein may derive metadata derivatives that represent non-content-based attributes of the files. These metadata derivatives may facilitate new search techniques and/or enable users involved in the electronic discovery to improve the quality and/or relevancy of their search results. For example, files with a certain subset of metadata derivatives may be more relevant and/or important to the lawsuit than files without the subset of metadata derivatives. As a result, by limiting search results to files that include both one or more specified keywords and the subset of metadata derivatives, the various systems and methods may refine searches to exclude files that include the keywords but are nevertheless irrelevant and/or unimportant to the lawsuit.

Figure 2:
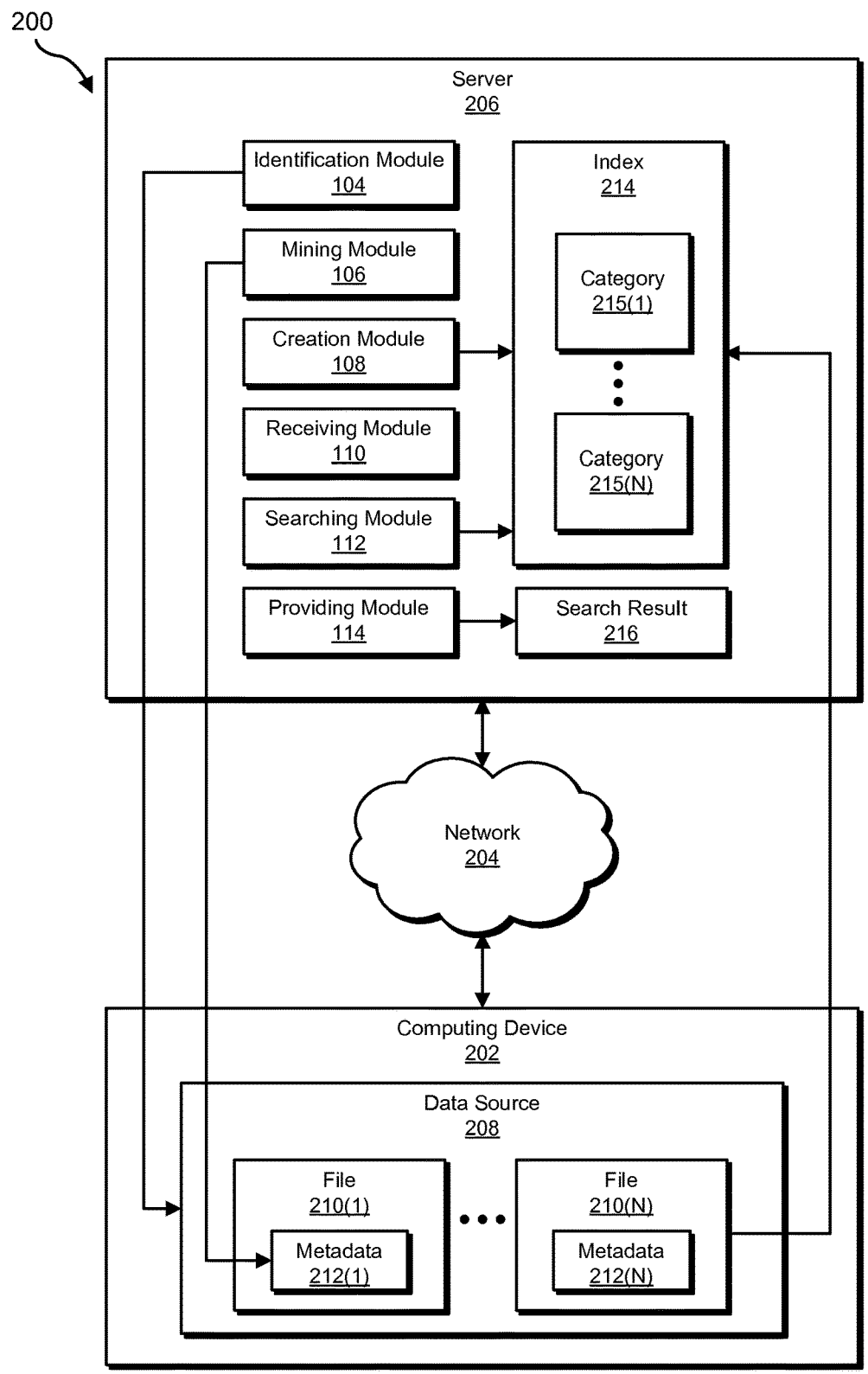
FIG. 2 is a block diagram of an additional exemplary system for culling search results in electronic discovery.

The following will provide, with reference to FIGS. 1-2, detailed descriptions of exemplary systems for culling search results in electronic discovery. Detailed descriptions of corresponding computer-implemented methods will also be provided in connection with FIG. 3-6. Detailed descriptions of an exemplary data source, graphical user interface, and search result will be provided in connection with FIGS. 4, 5, and 6, respectively. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for culling search results in electronic discovery. As illustrated in this figure, exemplary system 100 may include one or more modules 102 for performing one or more tasks. For example, and as will be explained in greater detail below, exemplary system 100 may include an identification module 104 that identifies at least one data source that is subject to electronic discovery in connection with a lawsuit. Exemplary system 100 may additionally include a mining module 106 that mines metadata of a plurality of files within the data source to generate metadata derivatives that describe non-content-based attributes of the files.

Moreover, exemplary system 100 may include a creation module 108 that creates an index that groups the files into a plurality of categories representative of the metadata derivatives. Exemplary system 100 may further include a receiving module 110 that receives, from a user involved in the electronic discovery, user input that specifies a subset of the categories within the index and a keyword. Additionally or alternatively, exemplary system 100 may also include a searching module 112 that searches the subset of categories within the index for a subset of the files whose contents include the keyword. Finally, exemplary system 100 may additionally include a providing module 114 that provides, to the user involved in the electronic discovery, a result of the search that identifies the subset of files whose contents include the keyword. Although illustrated as separate elements, one or more of modules 102 in FIG. 1 may represent portions of a single module or application (such as an electronic discovery tool).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. In this example, computing device 202 may include and/or store data source 208. Data source 208 may include and/or store files 210(1)-(N) and/or metadata 212(1)-(N) for files 210(1)-(N).

Additionally or alternatively, server 206 may be programmed with one or more of modules 102. In this example, server 206 may include and/or store an index 214 that groups files 210(1)-(N) into categories 215(1)-(N) representative of metadata derivatives generated based at least in part on metadata 212(1)-(N). Server 206 may also include and/or store a search result 216 that identifies at least a subset of files 210(1)-(N) whose contents include a keyword specified by the user and have been grouped into at least one of categories 215(1)-(N) specified by the user.

In one embodiment, one or more of modules 102 from FIG. 1 may, when executed by at least one processor of computing device 202 and/or server 206, enable computing device 202 and/or server 206 to cull search results in electronic discovery. For example, and as will be described in greater detail below, identification module 104 may identify at least one data source 208 that is subject to electronic discovery in connection with a lawsuit. Mining module 106 may mine metadata 212(1)-(N) of a plurality of files 210(1)-(N) within data source 208 to generate metadata derivatives that describe non-content-based attributes of files 210(1)-(N). Creation module 108 may create an index 214 that groups files 210(1)-(N) into a plurality of categories 215(1)-(N) representative of the generated metadata derivatives. Receiving module 110 may receive, from a user involved in the electronic discovery, user input that specifies a subset of categories 215(1)-(N) and a keyword. Searching module 112 may search the subset of categories 215(1)-(N) within index 214 for a subset of files 210(1)-(N) whose contents include the keyword. Providing module 114 may provide, to the user involved in the electronic discovery, a search result 216 that identifies the subset of files 210(1)-(N) whose contents include the keyword.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device capable of culling search results in electronic discovery. Examples of server 206 include, without limitation, application servers, web servers, cloud-based servers, network devices, storage servers, and/or database servers configured to run certain software applications and/or provide various web, cloud, network, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Data source 208 generally represents any type or form of electronic repository and/or database that stores files. For example, data source 208 may include and/or represent a repository that stores communications between employees of an enterprise. Examples of data source 208 include, without limitation, a repository for emails and/or instant messaging files, a repository for documents (such as word documents and/or spreadsheets), a repository for webpages (such as webpages of a social media platform and/or blogs), a repository for audio files and/or video files, a repository for files of all types read and/or written to by a certain user, variations of one or more of the same, combinations of one or more of the same, or any other suitable data source.

Files 210(1)-(N) generally represent any type or form of file, portion of a file, and/or file sample that includes data, metadata, and/or information. Examples of files 210(1) include, without limitation, documents, digital conversations, emails, email threads, digital chat sessions, profiles, web content, images, audio files, samples or portions of one or more of the same, variations of one or more of the same, combinations of one or more of the same, or any other suitable files.

Metadata 212(1)-(N) generally represents any type or form of information that identifies one or more characteristics and/or non-content-based attributes of a file. The term "non-content-based attribute," as used herein, generally refers to an attribute that describes at least a portion of a file but is not included in the content and/or payload of the file. In one example, one or more non-content-based attributes of a file may include and/or represent the organization and/or structure of the content and/or payload (as opposed to including and/or representing the content and/or payload itself). Additionally or alternatively, the text of a document may represent the content and/or payload of a file while a time of creation and/or the size of the file may represent a non-content-based attribute.

Categories 215(1)-(N) generally represent any type or form of grouping and/or classification of files 210(1)-(N). In some examples, categories 215(1)-(N) may each refer and/or correspond to a distinct metadata derivative generated based at least in part on metadata 212(1)-(N).

Index 214 generally represents any type or form of list, catalog, inventory, and/or record of categories 215(1)-(N). In one example, index 214 may itemize categories 215(1)-(N). In this example, index 214 may include, within each category, a list of references to each file that includes the metadata derivative related to the category. One or more of file 210(1)-(N) may be grouped into multiple categories within index 214.

Search result 216 generally represents any type or form of visual representation of one or more files that satisfy certain search criteria. For example, search result 216 may include a list, catalog, and/or database of a subset of files 210(1)-(N) that satisfy the search criteria specified by a user of an electronic discovery tool.

Figure 3:
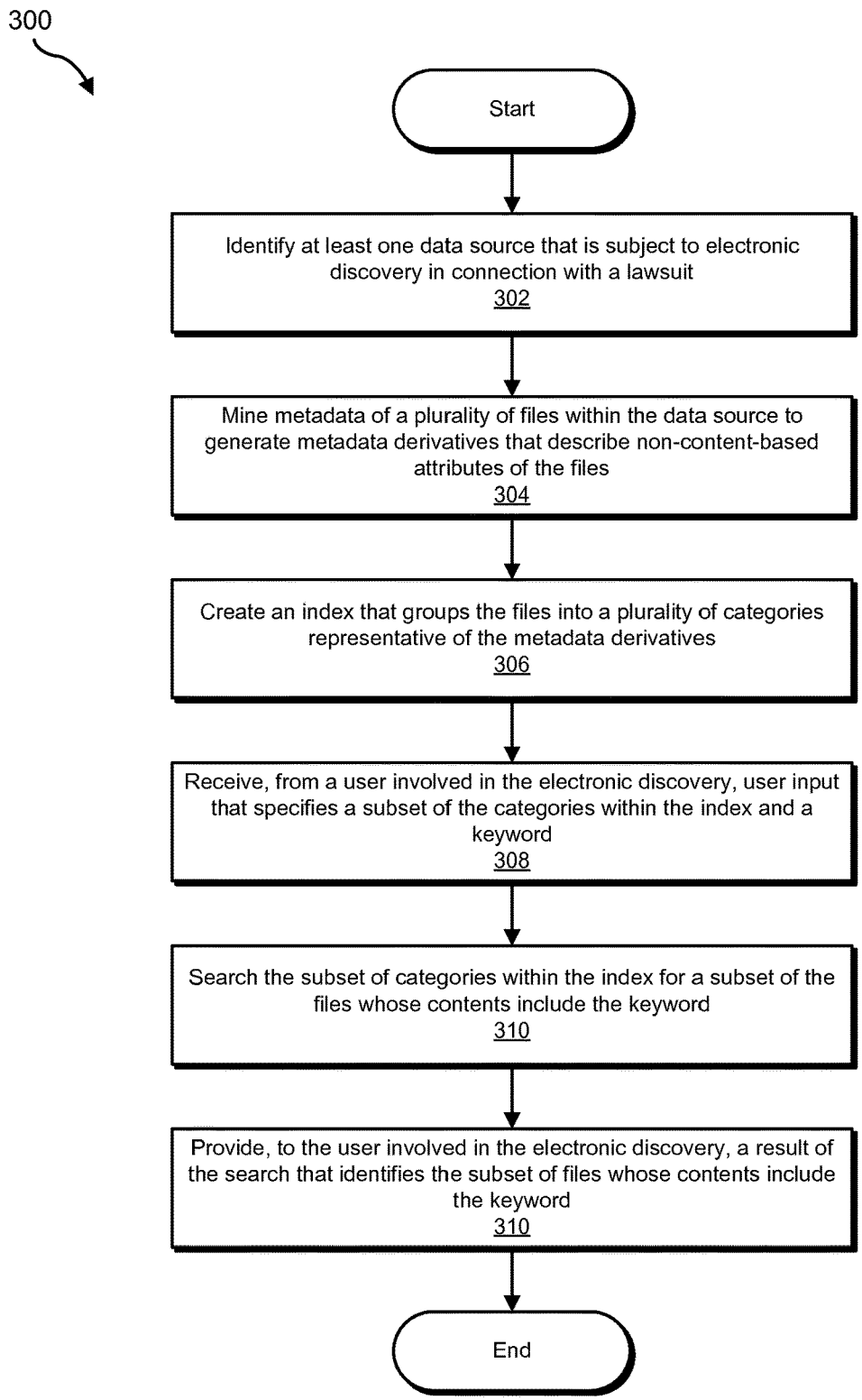
FIG. 3 is a flow diagram of an exemplary method for culling search results in electronic discovery.

FIG. 3 is a flow diagram of an exemplary computer-implemented method 300 for culling search results in electronic discovery. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may identify at least one data source that is subject to electronic discovery in connection with a lawsuit. For example, identification module 104 may, as part of server 206 and/or computing device 202 in FIG. 2, identify at least one data source 208 that is subject to electronic discovery in connection with a lawsuit. The term "electronic discovery," as used herein, generally refers to any type or form of process and/or procedure in which parties to a lawsuit or dispute request and/or obtain electronically stored information from one another in connection with the lawsuit or dispute. Electronic discovery may involve requesting the production of content created and/or maintained by other parties.

Identification module 104 may identify data source 208 in a variety of ways. In one example, identification module 104 may identify data source 208 based at least in part on user uploads. For example, a user involved in the electronic discovery may upload data source 208 to the electronic discovery tool and/or expose data source 208 to the electronic discovery tool. As the user uploads and/or exposes data sources 208, identification module 104 may identify data source 208.

In another example, identification module 104 may identify data source 208 based at least in part on user requests. For example, a user involved in the electronic discovery may submit a request to search data source 208. In response to the user's request to search data source 208, identification module 104 may identify data source 208.

At step 304, one or more of the systems described herein may mine metadata of a plurality of files within the data source to generate metadata derivatives that describe non-content-based attributes of the files. For example, mining module 106 may, as part of server 206 and/or computing device 202 in FIG. 2, mine metadata 212(1)-(N) of plurality of files 210(1)-(N) within data source 208 to generate metadata derivatives that describe non-content-based attributes of files 210(1)-(N). In other words, the metadata derivatives may include and/or represent information that has been derived from metadata 212(1)-(N) and/or transformed from one context and/or form into another context and/or form.

Accordingly, the term "metadata derivative," as used herein, generally refers to any type or form of information that is derived from other metadata and identifies one or more characteristics and/or non-content-based attributes of a file. As an example, one or more metadata derivatives may include and/or represent non-intuitive metadata of a file that is not explicitly described in the original metadata of the file but is derived from the original metadata of the file.

Mining module 106 may mine metadata 212(1)-(N) and/or generate the metadata derivatives in a variety of ways. In some examples, mining module 106 may mine metadata 212(1)-(N) by analyzing metadata 212(1)-(N). For example, mining module 106 may extract metadata 212(1)-(N) from files 210(1)-(N). In some examples, mining module 106 may analyze metadata 212(1)-(N) by analyzing the structure and/or organization of the content of files 210(1)-(B) (as opposed to analyzing the content itself).

In one example, mining module 106 may generate the metadata derivatives by deriving the metadata derivatives from the information extracted from metadata 212(1)-(N). For example, metadata 212(1)-(N) may represent primary metadata that includes information about files 210(1)-(N) in a first context. In this example, mining module 106 may generate the metadata derivatives by deriving, from metadata 212(1)-(N), metadata derivatives that represent the information about files 210(1)-(N) in a second context that differs from the first context.

Figure 4:
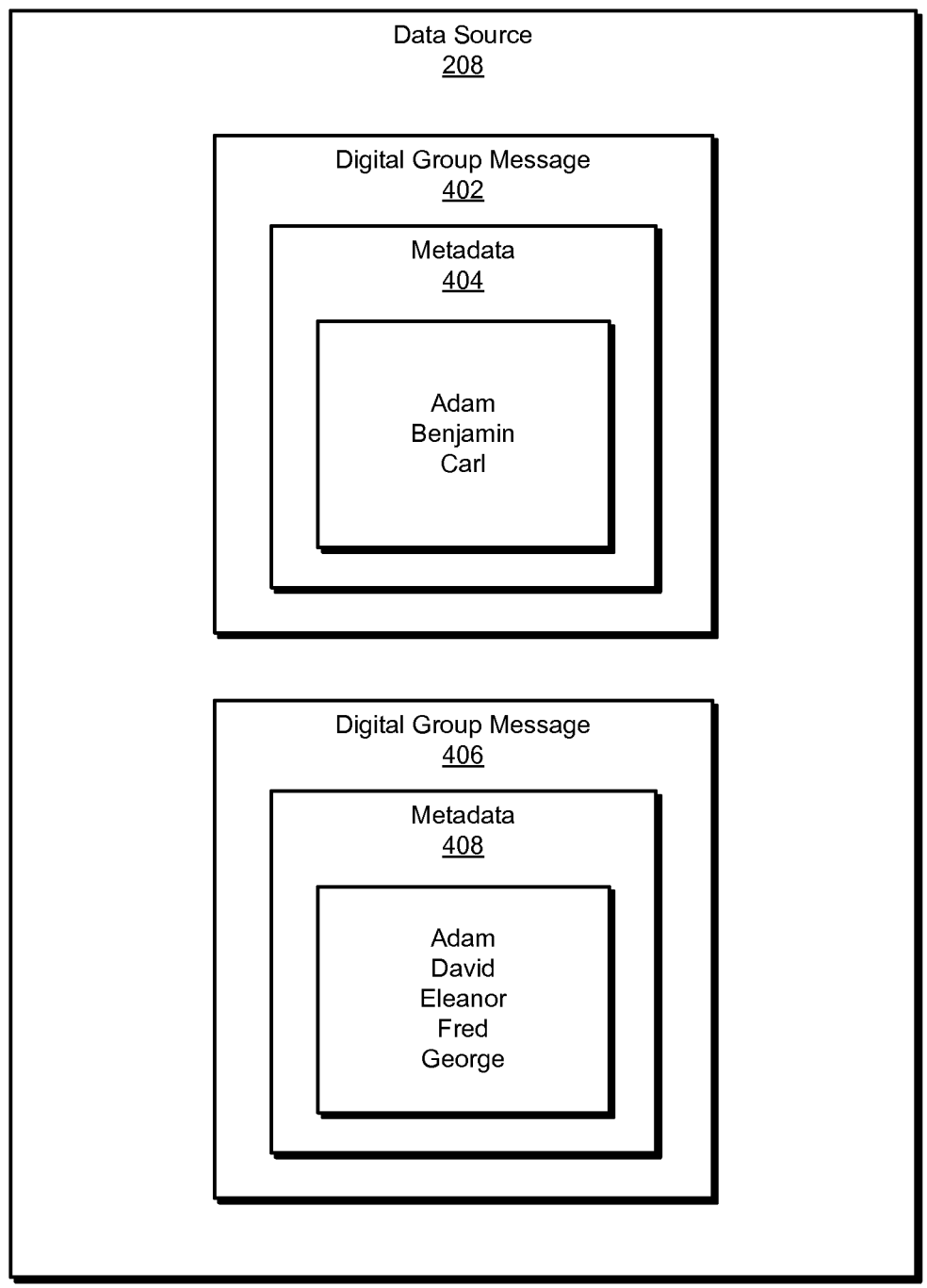
FIG. 4 is a block diagram of an exemplary computing system for culling search results in electronic discovery.

For example, as shown in FIG. 4, data source 208 may represent a repository for digital group messages, such as digital group message 402 and digital group message 406. Mining module 106 may identify metadata 404 that specifies Adam, Benjamin, and Carl as having contributed to the text of digital group message 402. Similarly, mining module 106 may identify metadata 408 that specifies Adam, David, Eleanor, Fred, and George as having contributed to the content of digital group message 406.

In this example, the names of the contributors may represent information about digital group message 402 and digital group message 406 in a first context. Then, mining module 106 may derive, from the names of the contributors, a number of contributors for each file. For example, mining module 106 may derive, based at least in part on the names of Adam, Benjamin, and Carl in connection with digital group message 402, that three users contributed to the content of digital group message 402. Similarly, mining module 106 may derive, based at least in part on the names of Adam, David, Eleanor, Fred, and George in connection with digital group message 406, that five users contributed to the content of digital group message 406. Thus, the number of users who contributed to digital group message 402 and digital group message 406 may represent information about digital group message 402 and digital group message 406 in a second context that, while related to the first context, differs from the first context.

As another example, metadata 212(1) may represent an amount of content in file 210(1) created by a certain user. In this example, mining module 106 may derive a metadata derivative from metadata 212(1) by calculating a participation score of the certain user for file 210(1) based on the amount of content in file 210(1) created by the certain user. The metadata derivatives may include the participation score of the certain user for file 210(1). The term "participation score," as used herein, generally refers to any type or form of score and/or classification that indicates the activity level of a user relative to certain digital content.

In one example, mining module 106 may derive the participation level or score from metadata 212(1) even though metadata 212(1) does not explicitly describe a participation level or score. In other words, metadata 212(1) itself may not suffice as a participation level or score. As such, instead of simply identifying the participation level or score in metadata 212(1), mining module 106 may derive the participation level or score by mining and/or repurposing information from metadata 212(1).

In some examples, the participation score may indicate that the certain user was passive, average, and/or active in creating a document and/or digital conversation. For example, mining module 106 may give users who contributed more than ten messages to a digital conversation an active participation score, users who contributed between one and five messages an average participation score, and users who were logged into the message but did not contribute any messages to the digital conversation a passive participation score. In some examples, mining module 106 may base a participation score on a number of likes and/or comments to a social media post and/or blog.

As another example, files 210(1)-(N) may represent web pages and metadata 212(1)-(N) may represent a number of comments posted to files 210(1)-(N). In this example, mining module 106 may derive metadata derivatives from metadata 212(1)-(N) by calculating popularity scores for files 210(1)-(N) based on the number of comments posted to files 210(1)-(N). The metadata derivatives may include the popularity scores. The term "popularity score," as used herein, generally refers to any type or form of score and/or classification that indicates the popularity level of certain digital content. For example, mining module 106 may give web pages that include more than five hundred comments a high popularity score, web pages that include between fifty and five hundred comments a medium popularity score, and web pages that include fewer than fifty comments a minimal popularity score.

Other examples of metadata derivatives include, without limitation, a number of messages included in a file, a number of authors who contributed content to a file, a number of images and/or videos included in a file, a ratio of a number of messages in the file to total size of a file, a location of a file and/or an author of a file, an author of a file who most recently and/or most frequently updated the file, an author of a file who initiated a digital conversation included in the file, a status of an author of a file (such as the author's position in an enterprise), an amount of time a blog has been online, a date of a first write and/or most recent write of a file, a gender of an author of a file, variations of one or more of the same, combinations of one or more of the same, or any other suitable metadata derivatives. In some examples, mining module 106 may derive a metadata derivative based on a single metadata attribute included in metadata 212(1)-(N). In other examples, mining module 106 may derive the metadata derivative based on a combination of multiple metadata attributes included in metadata 212(1)-(N).

In some examples, identification module 104 may identify, in addition to identifying data source 208, an additional data source. In these examples, mining module 106 may determine that file 210(1) is related to a file within the additional data source. For example, data source 208 may represent a repository of digital group messages, file 210(1) may represent a digital group message initiated by a certain user, the additional data source may represent a repository of enterprise statistics, and the additional file may represent a document including a list of the names of enterprise employees. In this example, mining module 106 may determine that the user who initiated file 210(1) is listed as an employee in the additional file. Thus, file 210(1) and the additional file may be related because they both include a reference to the same user. Upon making this determination, mining module 106 may generate a metadata derivative for file 210(1) (e.g., the employment status of the certain user) based on the metadata of the additional file (e.g., the list of enterprise employees).

At step 306, one or more of the systems described herein may create an index that groups the files into a plurality of categories representative of the metadata derivatives. For example, creation module 108 may, as part of server 206 and/or computing device 202 in FIG. 2, create index 214 that groups files 210(1)-(N) into categories 215(1)-(N) representative of the metadata derivatives.

Creation module 108 may create index 214 in a variety of ways. In one example, creation module 108 may create index 214 by organizing and/or indexing categories 215(1)-(N). For example, creation module 108 may create categories 215(1)-(N) by creating a category for each metadata derivative generated in step 304. Creation module 108 may then index and/or organize categories 215(1)-(N) within index 214.

In some examples, creation module 108 may add, to each category in index 214, references to files that include the metadata derivative represented by the category and/or a copy of the files themselves. In one example, creation module 108 may create category 215(1) for files that includes at most three participants. For example, creation module 108 may add a reference to digital group message 402 illustrated in FIG. 4 to category 215(1) since digital group message 406 includes three participants. In this example, creation module 108 may not insert a reference to digital group message 406 illustrated in FIG. 4 to category 215(1) since digital group message 406 includes five participants. The reference to digital group message 406 may identify the location of digital group message 406 within data source 208.

In some examples mining module 106 may divide one or more categories into a plurality of subcategories. For example, mining module 106 may divide category 215(1) into a high-access subcategory, a moderate-access subcategory, and a low-access subcategory. In the event that a metadata derivative category represents a number of users who accessed a file, a high-access subcategory may include files that have been accessed by more than twenty users. In this example, a moderate-access subcategory may include files that have been accessed by between ten and twenty users. Finally, a low-access subcategory may include files that have been accessed by fewer than ten users.

Returning to FIG. 3, at step 308, one or more of the systems described herein may receive, from a user involved in the electronic discovery, user input that specifies a subset of the categories within the index and a keyword. For example, receiving module 110 may, as part of server 206 and/or computing device 202 in FIG. 2, receive user input from a user involved in the electronic discovery. In this example, the user input may specify a subset of categories 215(1)-(N) within index 214. Additionally or alternatively, the user input may specify a keyword.

Receiving module 110 may receive the user input in a variety of ways. In some examples, receiving module 110 may receive the user input upon initiation of a search by the user involved in the electronic discovery. For example, a user may initiate a search of data source 208 in connection with the lawsuit. During this search, the user may enter user input that specifies category 215(1) and a keyword via a user interface. As the user enters the user input, receiving module 110 may receive the user input via the user interface.

Figure 5:
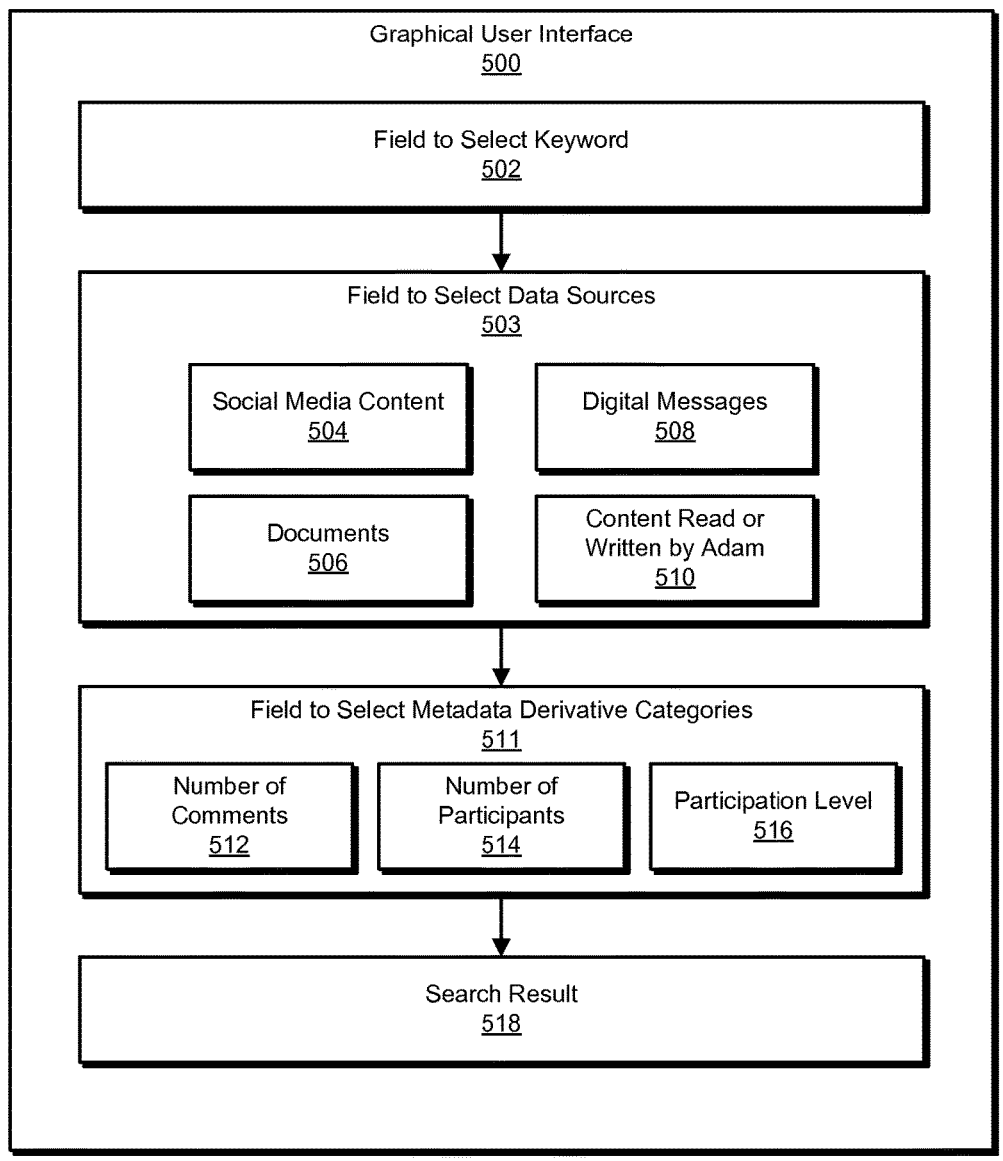
FIG. 5 is a block diagram of an exemplary graphical user interface.

As a specific example, providing module 114 may, via graphical user interface 500 in FIG. 5, present a field 502 in FIG. 5 to select one or more keywords. In this example, receiving module 110 may determine that the user initiated the search in response to receiving input via field 502.

In some examples, providing module 114 may additionally present various data sources to the user and allow the user to select from which data sources he or she would like to search. For example, providing module 114 may present a data source of social media content 504 in FIG. 5, a data source of documents 506 in FIG. 5, a data source of digital messages 508 in FIG. 5, and a data source of content 510 in FIG. 5 read or written by an individual named Adam. Providing module 114 may present the various data sources in a field 503 in FIG. 5 to select data sources. Receiving module 110 may then allow the user to select some or all of the presented data sources for searching from field 503.

In some embodiments, receiving module 110 may receive user input identifying certain categories selected by the user. In these embodiments, providing module 114 may, in response to determining that the user has initiated the search, present categories 215(1)-(N) to the user. For example, providing module 114 may present a "number of comments" category 512 in FIG. 5, a "number of participants" category 514 in FIG. 5, and a "participation level" category 516 in FIG. 5. In some examples, providing module 114 may present the categories in a field 511 in FIG. 5 to select metadata derivative categories. The user may select some or all of the presented metadata derivative categories for searching via field 511. Receiving module 110 may then receive user input that identifies the categories selected by the user.

In one example, providing module 114 and/or receiving module 110 may further allow the user to refine his/her search by receiving, from the user, an operator (e.g., <, >, < >, ==, etc.) and a value (e.g., 1, 5, 10, etc.) for each metadata derivative selected by the user. For example, in the event that the user has selected the "number of participants" category 514 in FIG. 5, providing module 114 and/or receiving module 110 may allow the user to refine his/her search to only files with more than ten participants and specify, in addition to the selection of category 514, the operator ">" and the value "10." In these examples, the value may be a numeric constant and/or string literal. Receiving module 110 may receive the user input and combine metadata derivatives based on the user input using Boolean logic.

In the event that the metadata derivative categories have been broken down into subcategories, providing module 114 may present the subcategories to the user. Receiving module 110 may then receive user input that identifies the subcategories selected by the user.

By allowing the user to select data sources, categories of metadata derivatives, and/or subcategories of metadata derivatives, receiving module 110 may enable the user to obtain a search result 518 in FIG. 5 that has been narrowed to only include files that include the keywords, data sources and/or metadata derivatives selected by the user.

Returning to FIG. 3, at step 310, one or more of the systems described herein may search the subset of categories within the index for a subset of the files whose contents include the keyword. For example, searching module 112 may, as part of server 206 and/or computing device 202 in FIG. 2, search the subset of categories within index 214 for a subset of files 210(1)-(N) whose contents include the keyword.

Searching module 112 may search index 214 in a variety of ways. In some examples, searching module 112 may search all of the files within data source 208 for files whose contents include the keyword. In other examples, searching module 112 may search only files within the subset of categories 215(1)-(N) selected by the user as part of step 308 for files whose contents include the keyword. In these examples, the subset of categories 215(1)-(N) may include some but not all of categories 215(1)-(N).

At step 312, one or more of the systems described herein may provide, to the user involved in the electronic discovery, a result of the search that identifies the subset of files whose contents include the keyword. For example, providing module 114 may, as part of computing device 202 and/or server 206 in FIG. 2, provide search result 216 that identifies the subset of files 201(1)-(N) whose contents include the keyword.

Providing module 114 may provide search result 216 in a variety of ways. In some examples, providing module 114 may provide a search result that identifies all of the files identified during the search. For example, in the event that searching module 112 searched only files within the subset of categories 215(1)-(N), search result 216 may identify all of the files identified during the search of the subset of the categories. In other examples, search result 216 may identify only files that are included in at least a certain number of the categories within the subset of categories 215(1)-(N). For example, search result 216 may identify only files that are included in all of the categories within the subset of categories 215(1)-(N).

In the event that searching module 112 searched all of files 210(1)-(N) within data source 208, providing module 114 may display only search results that include files within the subset of files 210(1)-(N) in search result 216. Additionally or alternatively, providing module 114 may display all of the search results. In these examples, providing module 114 may differentiate the files whose contents include the keyword and that have been grouped into at least one of the subset of categories 215(1)-(N) from files whose contents include the keyword but have not been grouped into any of the subset of categories 215(1)-(N). In some examples, providing module 114 may differentiate the files whose contents include the keyword and have been grouped into at least one of the subset of categories 215(1)-(N) by placing them in a separate location from the files whose contents include the keyword but have not been grouped into any of the subset of categories 215(1)-(N). Additionally and/or alternatively, providing module 114 may change a font, color, and/or contour in search result 216 for the files whose contents include the keyword and have been grouped into at least one of the subset of categories 215(1)-(N).

In some examples, providing module 114 may identify a weight assigned to each metadata derivative category 215(1)-(N). The weight may be selected by a user and/or entered via user input. In these examples, providing module 114 may assign a weighted score to each file whose contents include the keyword and has been grouped into at least one of the subset of categories 215(1)-(N). For example, providing module 114 may assign the weighted score to each file by aggregating the weights of each category into which the file has been grouped.

Figure 6:
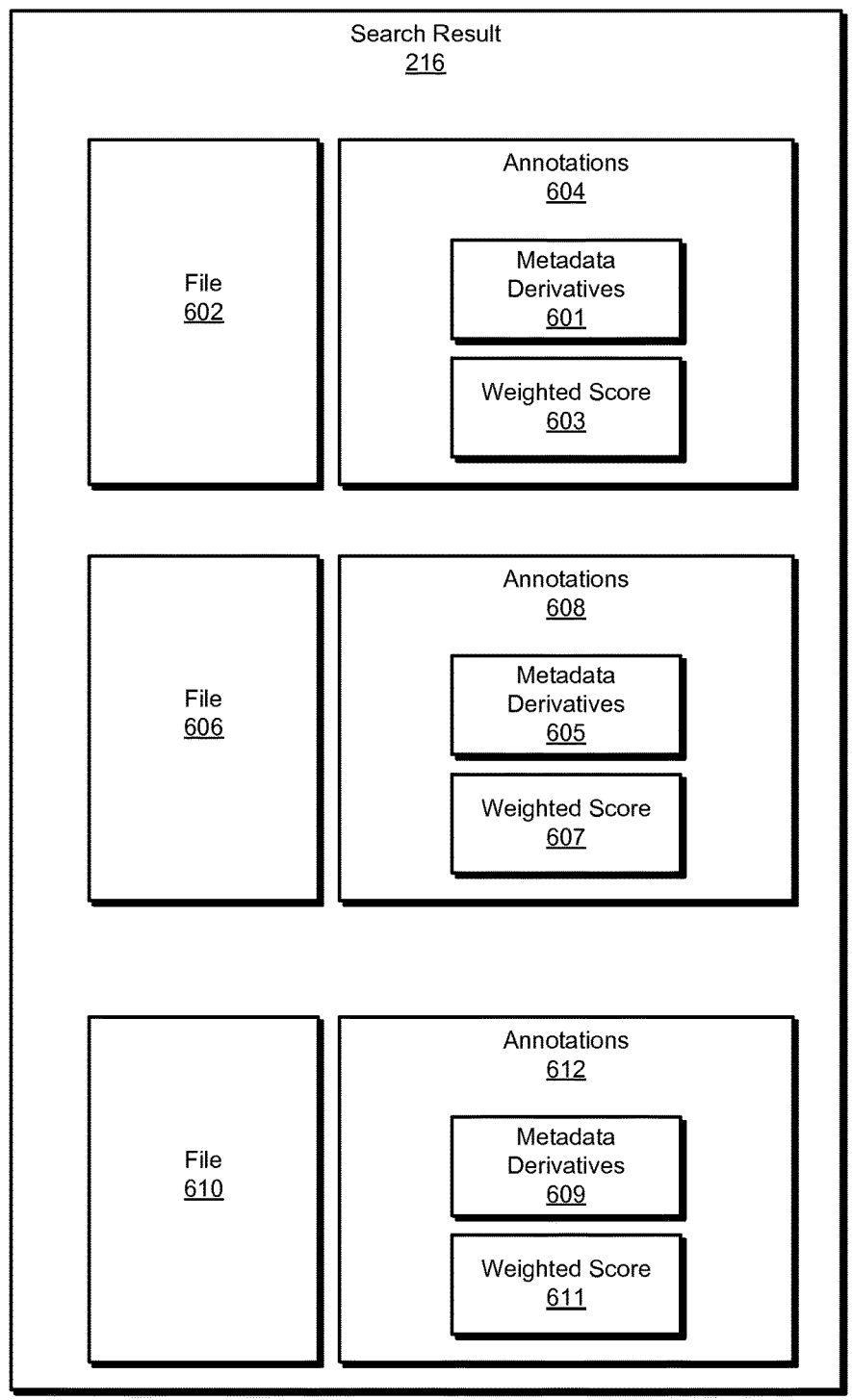
FIG. 6 is a block diagram of an exemplary search result.

In one example, providing module 114 may order the files included in search result 216 such that files with higher weighted scores are placed above files with lower scores in a list. For example, providing module 114 may determine that a search result 216 identifies a file 602 in FIG. 6, a file 606 in FIG. 6, and a file 610 in FIG. 6. In this example, providing module 114 may determine that a weighted score 603 of file 602 in FIG. 6 is higher than a weighted score 607 of file 606 in FIG. 6 and that weighted score 607 is higher than a weighted score 611 of file 610 in FIG. 6. Based on this determination, providing module 114 may place file 606 above file 610 and file 602 above file 606 in a display of search result 216 in FIG. 6.

In some examples, providing module 114 may additionally annotate the displayed references to the files included in search result 216. For example, providing module 114 may display metadata derivatives 601 of file 602 in FIG. 6, metadata derivatives 605 of file 606 in FIG. 6, and metadata derivatives 609 of file 610 in FIG. 6. In some examples, metadata derivatives 601, metadata derivatives 605, and metadata derivatives 609 may include and/or represent all of the metadata derivatives derived from the metadata of the respective files. In other examples, metadata derivatives 601, metadata derivatives 605, and metadata derivatives 609 may include only the metadata derivatives represented by the categories specified by the user input.

As described above, the disclosed systems and method may effectively cull the results of searches by processing and/or repurposing metadata for a set of files prior to searching the files in electronic discovery. For example, the pre-search processing and/or repurposing may involve grouping the files into searchable non-content-based categories to facilitate narrowing the results of a keyword search by returning only files that were grouped into the searchable categories.

Figure 7:
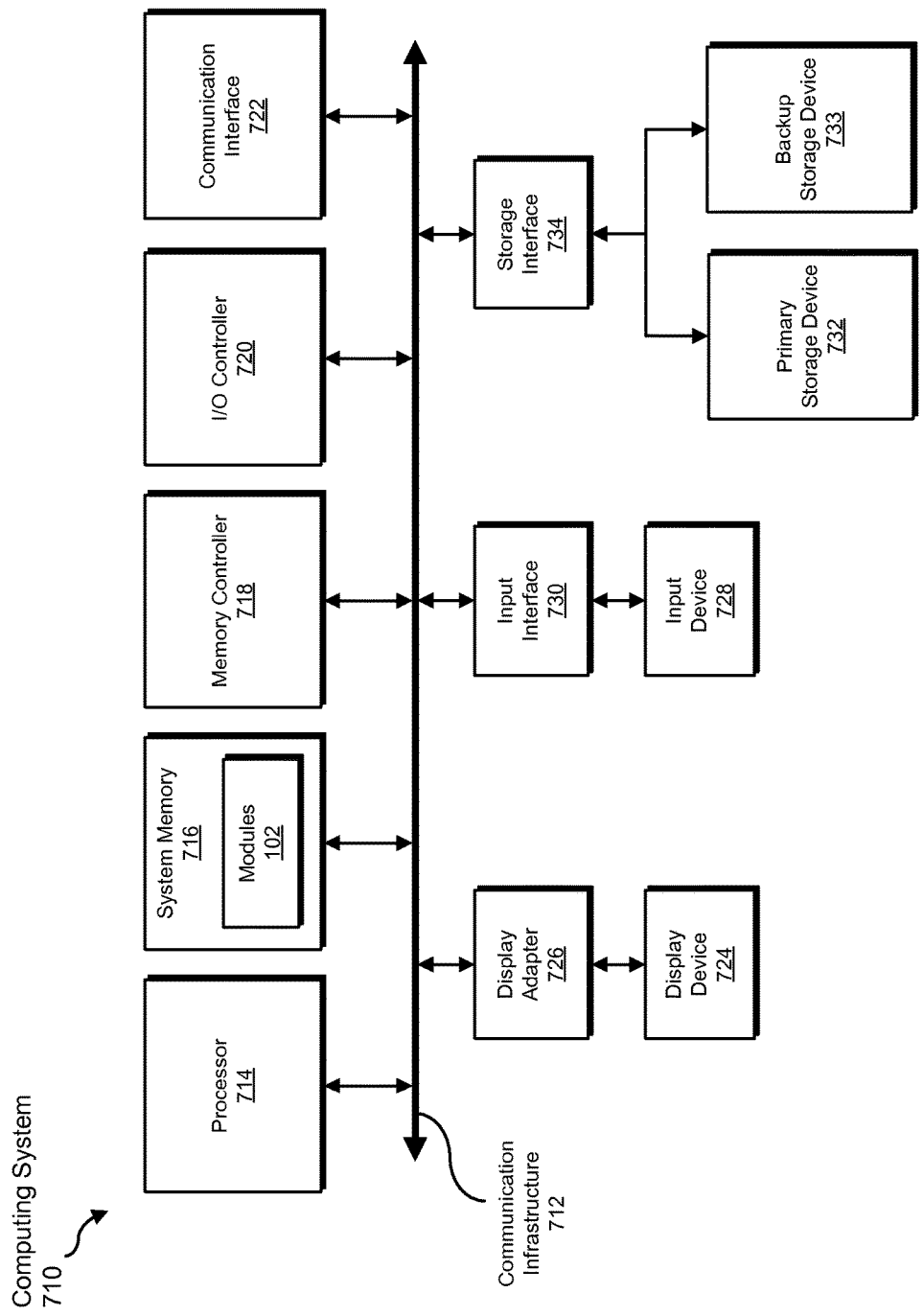
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 may include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, refers generally to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
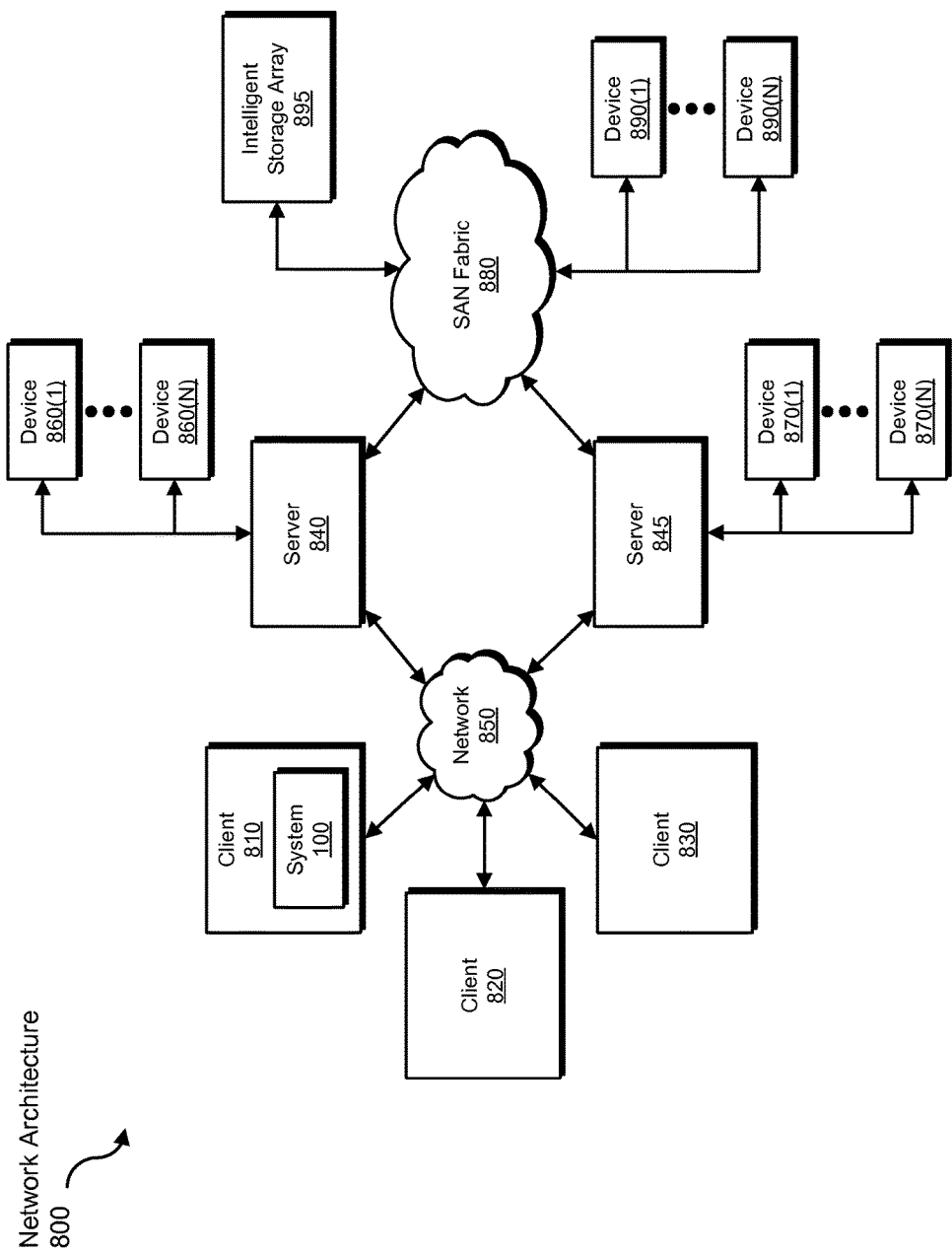
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for culling search results in electronic discovery.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" refers generally to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" refers generally to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data from a data source and output a subset of the data that includes certain keywords and certain metadata derivatives. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for culling search results in electronic discovery, at least a portion of the method being performed by a computing device comprising at least one processor, the method comprising:

identifying at least one data source that is subject to electronic discovery in connection with a lawsuit involving an enterprise, wherein the data source comprises a repository of digital group messages;

identifying an additional data source comprising a document including a list of the enterprise's employees;

determining that content from the data source with particular metadata derivatives may be more relevant to the lawsuit than content from the data source without the particular metadata derivatives, wherein the particular metadata derivatives comprise a participation score for a user involved in the content and a position of the user within the enterprise;

in response to the determination:

mining metadata of a plurality of digital group messages within the data source to identify primary metadata for each of the digital group messages, wherein the primary metadata comprises an amount of content, in each of the digital group messages, created by a certain user;

generating metadata derivatives of the primary metadata, wherein generating the metadata derivatives comprises:

calculating, for each of the digital group messages, a participation score for the certain user that is based on the amount of content in the digital group message created by the certain user; and querying the additional data source to identify the certain user's position within the enterprise;

creating an index that groups the digital group messages into a plurality of categories representative of the metadata derivatives, wherein:
- each category is indicative of a different level of participation and a different position within the enterprise; and
- each of the digital group messages is grouped into a category based on the certain user's participation score calculated for the digital group message and the certain user's position within the enterprise identified from the additional data source;

receiving, from a user involved in the electronic discovery, a search query that specifies a subset of the categories within the index indicative of one or more specified levels of participation and one or more specified positions within the enterprise, and a keyword; and providing, to the user involved in the electronic discovery, a search result that identifies all of the digital group messages whose contents include the keyword and that differentiates the digital group messages, whose contents include the keyword, that belong to one of the specified subset of categories indicative of the one or more specified levels of participation and one of the specified subset of categories indicative of the one or more specified positions within the enterprise.

2. The computer-implemented method of claim 1, wherein calculating the participation score for each of the digital group messages comprises calculating the participation score based on a number of messages contributed by the certain user to each of the digital group messages.

3. The computer-implemented method of claim 1, wherein differentiating the digital group messages that belong to one of the specified subset of categories comprises changing at least one of a font, a color, and a contour of the differentiated digital group messages.

4. The computer-implemented method of claim 1, wherein differentiating the digital group messages that belong to one of the specified subset of categories comprises placing the differentiated digital group messages in a separate location from digital group messages whose contents include the keyword but do not belong to one of the specified subset of categories.

5. The computer-implemented method of claim 1, further comprising:
- determining that the user has initiated a search of the data source in connection with the lawsuit;
- in response to determining that the user has initiated the search, presenting the plurality of categories to the user via a user interface; and
- upon presenting the plurality of categories to the user, receiving the search query that specifies the subset of categories via the user interface.

6. The computer-implemented method of claim 1, wherein the participation score indicates that the certain user was at least one of:
- a passive participant;
- an average participant; and
- an active participant.

7. The computer-implemented method of claim 1, wherein:
- the primary metadata further comprises names of all users who contributed to creating the contents of the digital group messages.

8. The computer-implemented method of claim 7, wherein:
- deriving the metadata derivatives further comprises calculating a number of users who contributed to creating the content of the digital group messages based at least in part on the names of the users who contributed to creating the content of the digital group messages.

9. The computer-implemented method of claim 1, wherein:
- receiving the search query comprises receiving user input that specifies two or more of the categories within the index.

10. The computer-implemented method of claim 9, wherein:
- providing the search result to the user comprises:
  - identifying a weight that has been assigned to each category within the plurality of categories;
  - assigning a weighted score for each digital group message within the digital group messages whose contents include the keyword by aggregating, for each digital group message whose contents include the keyword, the weights of each category into which the digital group message has been grouped;
  - ordering the digital group messages whose contents include the keyword such that digital group messages with a higher score are placed above digital group messages with a lower score in a list.

11. The computer-implemented method of claim 1, wherein:
- the at least one data source comprises a first data source and a second data source;
- generating the metadata derivatives further comprises:
  - determining that a digital group message within a first data source is related to a digital group message within a second data source; and
  - generating, based at least in part on metadata of the digital group message within the first data source, a metadata derivative of the digital group message within the second data source.

12. The computer-implemented method of claim 11, wherein determining that the digital group message within the first data source is related to the digital group message within the second data source comprises determining that the digital group message within the first data source and the digital group message within the second data source both include a reference to a same user.

13. A system for culling search results in electronic discovery, the system comprising:
- an identification module, stored in memory, that:
  - identifies at least one data source that is subject to electronic discovery in connection with a lawsuit involving an enterprise, wherein the data source comprises a repository of digital group messages;
  - identifies an additional data source comprising a document including a list of the enterprise's employees;
  - determines that content from the data source with particular metadata derivatives may be more relevant to the lawsuit than content from the data source without the particular metadata derivatives, wherein the particular metadata derivatives comprise a participation score for a user involved in the content and a position of the user within the enterprise;
- a mining module, stored in memory, that:
  - mines metadata of a plurality of digital group messages within the data source to identify primary metadata for each of the digital group messages, wherein the primary metadata comprises an amount of content, in each of the digital group messages, created by a certain user;
  - generates metadata derivatives of the primary metadata by (1) calculating, for each of the digital group messages, a participation score for the certain user that is based on the amount of content in the digital group message created by the certain user and (2) querying the additional data source to identify the certain user's position within the enterprise;

a creation module, stored in memory, that creates an index that groups the digital group messages into a plurality of categories representative of the metadata derivatives, wherein:
  each category is indicative of a different level of participation and a different position within the enterprise;
  each of the digital group messages is grouped into a category based on the certain user's participation score calculated for the digital group message and the certain user's position within the enterprise identified from the additional data source;

a receiving module, stored in memory, that receives, from a user involved in the electronic discovery, a search query that specifies a subset of the categories within the index, indicative of one or more specified levels of participation, a subset of categories within the index indicative of one or more specified positions within the enterprise, and a keyword;

a providing module, stored in memory, that provides, to the user involved in the electronic discovery, a search result that identifies all of the digital group messages whose contents include the keyword and that differentiates the digital group messages, whose contents include the keyword, that belong to one of the specified subset of categories indicative of the one or more specified levels of participation and one of the specified subset of categories indicative of the one or more specified positions within the enterprise; and a physical processor configured to execute the identification module, the mining module, the creation module, the receiving module, and the providing module.

14. The system of claim 13, wherein calculating the participation score for each of the digital group messages comprises calculating the participation score based on a number of messages contributed by the certain user to each of the digital group messages.

15. The system of claim 13, wherein calculating the participation score for each of the digital group messages comprises calculating the participation score based on a number of comments posted to each of the digital group messages.

16. The system of claim 13, wherein:
the providing module is configured to differentiate the digital group messages that belong to one of the specified subset of categories by changing at least one of a font, color, and a contour of the differentiated digital group messages.

17. The system of claim 13, wherein the providing module differentiates the digital group messages by placing the differentiated digital group messages in a separate location from digital group messages whose contents include the keyword but do not belong to one of the specified subset of categories.

18. A non-transitory computer-readable medium comprising one or more computer-readable instructions that, when executed by at least one processor of a computing device, cause the computing device to:
  identify at least one data source that is subject to electronic discovery in connection with a lawsuit involving an enterprise, wherein the data source comprises a repository of digital group messages;
  identify an additional data source comprising a document including a list of the enterprise's employees;
  determine that content from the data source with particular metadata derivatives may be more relevant to the lawsuit than content from the data source without the particular metadata derivatives, wherein the particular metadata derivatives comprise a participation score for a user involved in the content and a position of the user within the enterprise;
  mine metadata of a plurality of digital group messages within the data source to identify primary metadata for each of the digital group messages, wherein the primary metadata comprises an amount of content, in each of the digital group messages, created by a certain user;
  generate metadata derivatives of the primary metadata, wherein generating the metadata derivatives comprises:
    calculating, for each of the digital group messages, a participation score for the certain user that is based on the amount of content in the digital group message created by the certain user; and
    querying the additional data source to identify the certain user's position within the enterprise;
  create an index that groups the digital group messages into a plurality of categories representative of the metadata derivatives, wherein:
    each category is indicative of a different level of participation and a different position within the enterprise; and
    each of the digital group messages is grouped into a category based on the certain user's participation score calculated for the digital group message and the certain user's position within the enterprise identified from the additional data source;
  receive, from a user involved in the electronic discovery, a search query that specifies a subset of the categories within the index, indicative of one or more specified levels of participation, a subset of categories within the index indicative of one or more specified positions within the enterprise, and a keyword; and
  provide, to the user involved in the electronic discovery, a search result that identifies all of the subset of digital group messages whose contents include the keyword and that differentiates the digital group messages, whose contents include the keyword, that belong to one of the specified subset of categories indicative of the one or more specified levels of participation and one of the specified subset of categories indicative of the one or more specified positions within the enterprise.

19. The non-transitory computer-readable medium of claim 18, wherein the computer-readable instructions cause the computer to calculate the participation score for each of the digital group messages by causing the computer to calculate the participation score based on a number of messages contributed by the certain user to each of the digital group messages.

20. The non-transitory computer-readable medium of claim 18, wherein the computer-readable instructions cause the computer to differentiate the digital group messages that belong to one of the specified subset of categories by causing the computer to change at least one of a font, a color, and a contour of the differentiated digital group messages.

* * * * *